United States Patent

[11] 3,632,412

[72] Inventors: Robert B. Blance, East Longmeadow; Donald M. Gardner, Springfield, both of Mass.
[21] Appl. No.: 812,826
[22] Filed: Apr. 2, 1969
[45] Patented: Jan. 4, 1972
[73] Assignee: Monsanto Company, St. Louis, Mo.

[54] ELECTRICAL TAPE
10 Claims, 1 Drawing Fig.

[52] U.S. Cl. .................... 117/122 P, 117/122 PF, 117/122 PA, 117/124 E, 117/138.8 UF, 117/138.8 N, 117/138.8 F, 117/161 UC, 260/81.6
[51] Int. Cl. .................... C09j 7/02
[50] Field of Search .................... 117/122 P, 122 PF, 122 PA, 161 UC, 124 E, 138.8 UF, 138.8 F, 138.8 N; 260/81.6

[56] References Cited
UNITED STATES PATENTS
3,269,994  8/1966  Horn et al. .................... 117/122 X
3,307,690  3/1967  Bond et al. .................... 117/122 X OTHER REFERENCES
Temin et al., 1967, 33288m, Vol. 67, Chemical Abstracts
Takahashi et al., 1968, 88157p, vol. 68, Chemical Abstracts
Koide et al., 1967, 69408k, Chemical Abstracts

*Primary Examiner*—William D. Martin
*Assistant Examiner*—Bernard D. Pianalto
*Attorneys*—William J. Farrington, Arthur E. Hoffman and Russell H. Schlattman

ABSTRACT: Disclosed herein are solvent resistant Class F electrical tapes which comprise a backing member coated with a pressure-sensitive adhesive composition which is the polymeric product of (A) an ester of acrylic or methacrylic acid containing from seven to 20 carbon atoms; (B) a lower alkyl ester of acrylic or methacrylic acid; and (C) a hydroxy-bearing monomer.

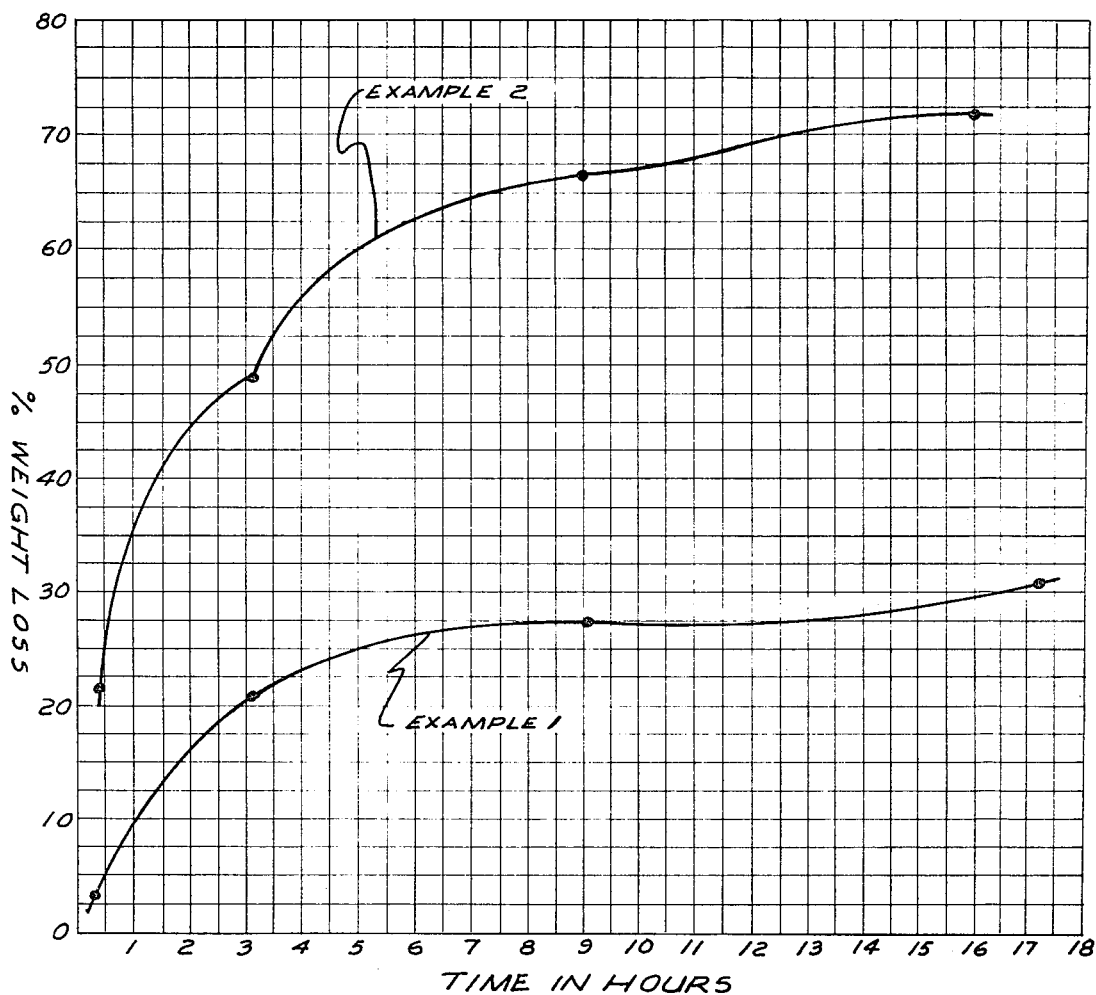
THERMOGRAVIMETRIC ANALYSIS IN AIR AT 300°C.
INVENTORS
ROBERT B. BLANCE
DONALD M. GARDNER
BY William J. Farrington
ATTORNEY

ELECTRICAL TAPE

BACKGROUND OF THE INVENTION

1. Field of the Invention

This invention is directed to electrical tapes. More specifically, this application is directed to solvent-resistant electrical tapes which comprise an inert backing member coated with a pressure-sensitive adhesive composition which can be used in Class F electrical applications as both an insulating and bonding member.

2. Description of the Prior Art

Pressure-sensitive electrical tapes are well known in the prior art. These tapes are used as insulating materials and for the purpose of bonding components in electrical systems. The tapes of the prior art are based on pressure-sensitive adhesive compositions such as carboxylic acid containing copolymers and copolymers of vinyl acetate and esters of acrylic or methacrylic acid. However, a major deficiency of these polymers is their inability to withstand the prolonged exposure to high temperatures which is required for use in Class F electrical systems. A Class F electrical system is defined as one which can withstand 20,000 hours at 155° C. under a 1 kv. load.

All of the components of a Class F system, the electrical hardware as well as the backing member and adhesive component of the tape, must be able to withstand the specified exposure. Moreover, any tape intended for use in Class F electrical insulation must be free of materials which would cause corrosion of the conductive parts.

Carboxylic acid containing polymers are a potential source of corrosion to the copper components of electrical systems. Other polymers which generate even small amounts of free volatile acid upon heating, such as vinyl acetate containing polymers which generate acetic acid, are also potential sources of corrosion. This corrosion causes voltage breakdown or current leakage thereby shortening the useful life of the electrical systems.

In addition to lacking the necessary thermal stability and freedom from corrosion causing constituents many of the polymers of the prior art lack the necessary oil and solvent resistance which is required in those applications where the electrical system is exposed to oil and/or organic solvents such as in hermetic type units and where the electrical system is coated with organic solvent-based insulating varnish sealants.

Although those polymers which are prepared by polymerizing an acrylic acid ester with a carboxylic acid monomer and/or vinyl acetate are well known in the art for their pressure-sensitive adhesive properties, these materials are generally regarded as unsuitable as an adhesive component in Class F electrical tapes because of the deficiencies pointed out above. Consequently, those skilled in the art must resort to the more costly silicon based pressure-sensitive adhesives for Class F application. Thus, there exists in the art a definite need for oil and solvent resistant acrylic based Class F electrical tape which is free from components which would cause corrosion of the conductive parts of the electrical system while withstanding prolonged exposure to high temperatures which is required for a Class F rating.

SUMMARY OF THE INVENTION

The present invention solves the aforementioned problems by providing thermally stable, oil and solvent resistant acrylic based Class F electrical tapes which minimize the danger of corrosion in electrical systems.

The Class F electrical tapes of the present invention comprise a thermally stable backing member which is coated with a pressure-sensitive adhesive composition which is the interpolymerization product of from 20 to 85 weight percent of A; 15 to 55 weight percent of B; and 1 to 20 weight percent of C wherein the total weight percent of A, B and C equals 100 weight percent; wherein (A) is a monomer selected from the group consisting of esters of acrylic acid containing of from 7 to 20 carbon atoms and esters of methacrylic acid containing of from eight to 20 carbon atoms; (B) is a monomer selected from the group consisting of ethyl, methyl, and propyl esters of acrylic acid and ethyl, methyl, propyl and butyl esters of methacrylic acid; and (C) is a hydroxy bearing monomer selected from the group consisting of hydroxy alkyl acrylates, hydroxy alkyl methacrylates, 2-hydroxy alkyl vinyl ether, hydroxy alkyl fumarates and hydroxy alkyl maleates wherein the alkyl group contains from two to four carbon atoms.

DESCRIPTION OF THE DRAWING

The FIGURE represents thermogravimetric analysis curves for pressure-sensitive adhesive compositions. The curves are obtained by plotting percent weight loss of the resin upon heating in air at 300 PC. against time in hours. The lower curve is for the polymer of example 1 which is prepared according to the teachings of the present invention. The other curve is for a pressure-sensitive adhesive composition of the prior art which is used as an electrical tape adhesive. The percent weight loss data is obtained using approximately 50 milligram samples in a Du Pont 950 Thermogravimetric Analyzer. These curves will be discussed in greater detail below.

DESCRIPTION OF THE PREFERRED EMBODIMENTS

The backing members which are used in the present invention must also be able to meet Class F requirements. Consequently, the choice of a backing member is limited to those materials which are oil and solvent resistant and which can withstand prolonged exposure to high temperatures. Moreover, the backing member must be an electrical insulator which is free of components which could cause corrosion to the conductive parts of the system. Examples of suitable backing members include sheets, films and cloths prepared from polyethylene terephthalate, mica paper, glass, polytetrafluoroethylene, polytrifluoromonochloroethylene, polyimides, etc.

The interpolymers of the present invention are prepared from at least one monomer from each of three special groups, designated A, B and C for the purposes of this invention which groups are defined above. The above-mentioned monomers of Group (A) are of the type which give internal plasticization to the copolymer, i.e., they contribute to a large free-volume in the copolymer and by enhancing segmental mobility, increase the wetting ability of the final polymeric product. Hence, tack and adhesion of the polymeric composition are attributable to this group of monomers. However, to provide the necessary balance between tacky adhesion and cohesive strength, monomers selected from groups (B) and (C) are also required. Monomers of Group (B) by themselves contribute substantially to cohesive strength by stiffening the molecular chains, but by far the larger contribution to cohesive strength is obtained from monomers of Group (C).

The interpolymers of this invention are conveniently prepared by organic solvent polymerization techniques involving in some cases delayed addition of monomer. The time interval for the delayed addition may range from about 10 to about 600 minutes and longer. The techniques in general, involve the polymerization of the respective monomer mixtures in suitable organic solvents, the polymerization being initiated by heat-activated free radical initiators.

The choice of solvents for the interpolymer used in the practice of this invention is governed by the solubility requirements of the monomers and the resulting interpolymers in that both the monomers and the resulting interpolymers should be soluble in the selected solvent or mixtures of solvents. A further requirement is that the interpolymer solution should contain less than 2 percent water by weight, based on the total weight of the solvent, in order to avoid adverse interference with any metal alkoxide component which may be used to cross link the polymer as is discussed below. More preferably, the interpolymer solution should contain less than 1 percent water by weight.

Examples of suitable solvents of the interpolymers include aromatic solvents such as benzene, toluene, xylene, etc. Suitable aliphatic solvents include alcohols such as methanol, ethanol, propanol, butanol, etc.; esters such as ethyl acetate, propyl acetate, isopropyl acetate, butyl acetate, etc.; ketones such as methyl ethyl ketone, acetone, etc.; aliphatic hydrocarbons such as pentane, hexane, etc. Especially useful are mixtures of the foregoing.

Polymerization initiators suitable for the preparation of the special interpolymers of this invention include free radical azo-type initiators such as: α,α'-azo-diisobutyronitrile; 2-(t-butylazo)isobutyronitrile; 2-t-butylazo-2-phenylpropane; 1-t-butylazo-;-phenylcyclohexane; 1-cyano-1-(t-butylazo)-cyclohexane; etc.

Other polymerization initiators would include organic peroxides which do not yield monomeric acid products capable of corroding copper wire. Examples of these would include: t-butylhydroperoxide; t-butyl peroxide; 1,1-bis(t-butylperoxy)3,3,5-trimethylcyclohexane; 2,2-bis(t-butylperoxy)butane; 2-methoxy-2-t-butylperoxypropane; 2,4,6-tri)t-butylperoxy)triazine; t-amyl peroxide; cumyl peroxide; etc. Ultraviolet light and gamma radiation can also be used to initiate the polymerization reaction.

The interpolymers of the present invention are cured to provide further thermal stability, to improve their solvent resistance to transformer oil and impregnating varnish, to increase their loadholding power, and to enhance the permanence of the bond. Curing may be effected with metal alkoxides, peroxides or blocked isocyanates. These curing agents can be incorporated in the resin solution without adverse effect on the solution stability.

Metallic alkoxides such as titanium butoxide, when they are formulated with the resin in alcohol solution, offer the advantage of rapid cure by formation of polyalkoxides when the solution is dried. Thus, initial load holding ability is readily obtained so that the tape can withstand the initial exposure to baking which is required to expel moisture from the assembly without softening excessively and yielding to shear forces.

Metal alkoxides which are used in the present invention are those represented by the following general formula:

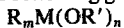
$$R_mM(OR')_n$$

where M is a metal selected from the group consisting of Groups II to VIII of the periodic table; R is selected from the group consisting of alkyl radicals of from one to eight carbon atoms and aryl radicals of from six to 16 carbon atoms. R' is selected from the group consisting of aliphatic and substituted aliphatic radicals containing from one to 18 carbon atoms; $m$ is an integer whose value is zero or greater and $n$ is an integer of at least 2, wherein the sum of $m+n$ is greater than 1 and is equal to the valence of the metal represented by M.

Examples of metal alkoxides for use in the practice of this invention include the following: magnesium ethoxide, calcium ethoxide, strontium ethoxide, barium ethoxide, aluminum ethoxide, aluminum isopropoxide, lanthanum t-butoxide, ferric ethoxide, ferric isopropoxide, titanium ethoxide, titanium isopropoxide, titanium butoxide, zirconium ethoxide, zirconium isopropoxide, zirconium butoxide, hafnium ethoxide, hafnium isopropoxide, cerium isopropoxide, germanium isopropoxide, stannic ethoxide, stannic isopropoxide, vanadium isopropoxide, chromium t-butoxide, niobium ethoxide, niobium isopropoxide, potassium zirconium ethoxide, magnesium aluminum ethoxide, potassium aluminum butoxide, sodium stannic ethoxide, and alkyl metal alkoxides such as diethoxy ethyl aluminum, dibutoxy diphenyl titanium, phenyl triisopropoxy titanium, dimethyl diisopropoxy titanium, dibutyl dimethoxy tin. Especially preferred are liquid alkoxides such as titanium isopropoxide and titanium butoxide.

The manner in which the metal alkoxide is added to the polymer solution is very critical and precautions must be taken in order to prevent the gelation of the resin solution. The metal alkoxide should be dissolved in a suitable solvent prior to adding the metal alkoxide to the polymer solution. Suitable solvents for the metal alkoxide include alcohols and carboxylic acids, preferably the lower boiling alcohols such as aliphatic alcohols containing from one to four carbon atoms, e.g., methanol, ethanol, propanol, and butanol, and lower boiling aliphatic acids containing from two to four carbon atoms, e.g., acetic, propionic and butyric acids. In the event that an acid solvent is used, precautions must be taken to remove all of the solvent from the resin during the drying stage in order to avoid having corrosive components in the electrical tape. Especially preferred are the alcoholic solvents. The solvent used to dissolve the metal alkoxide should be substantially anhydrous, i.e., contain less than 1 percent water by weight and more preferably less than 0.5 percent water by weight.

The amount of metal alkoxide used in a given polymer system will depend upon the nature of the system and the degree of cure desired. In general, at least 0.01 equivalent of metal alkoxide per equivalent of active hydrogen in the resin should be used. Preferably, one would use 0.05 equivalent of metal alkoxide and more preferably 0.1 equivalent of metal alkoxide, per equivalent of active hydrogen in the resin. The maximum amount of metal alkoxide used will depend on the particular resin system and metal alkoxide used and the degree of cross linking desired in the system. From a practical standpoint, no significant improvement in resin properties is found when using metal alkoxide in excess of five equivalents per equivalent of active hydrogen in the polymer. The reference to active hydrogen in the resin in regard to the amount of metal alkoxide to be used is to the hydrogen on the hydroxyl groups of the hydroxy bearing monomer referred to as Part C above.

Peroxides such as t-butyl peroxide and cumyl peroxide may be utilized in a heat-activated cure. These peroxides are chosen because they are highly efficient cross-linking agents which do not yield acid products upon decomposition so that no corrosion of the metal components in the electrical system can occur. A high degree of cure can be obtained with these peroxides at elevated temperatures. Other suitable peroxides for use as a curing agent include those listed above as polymerization initiators.

The amount of peroxide curing agent used in the practice of this invention is in the range of from 0.1 percent to 3.0 percent by weight based on the weight of solid polymer.

Blocked isocyanates such as the phenol adduct of tolylene diisocyanate may also yield a heat activated cure by interaction with hydroxyl to produce a high cross link density, dependent on the amount of hydroxy monomer introduced into the acrylate resin. Phenol is liberated during cure and may improve the thermal stability by functioning as an antioxidant.

While each of the methods of cure may be utilized alone, a combination of the alkoxide and peroxide cures is preferred. In this manner, a dried coated backing member is obtained, which is pressure-sensitive but cross linked to a sufficient degree by the alkoxide to acquire excellent initial load-holding ability. This coated substance cures further via the peroxide-curing mechanism to a densely cross linked network at the baking temperature of equipment (180° to 300° F. for 30 minutes to 18 hours) so that the final resin has excellent oil and solvent resistance as well as excellent bonding ability.

The following examples are set forth in illustration of the present invention and are not to be construed as limitations thereof. All parts and percentages are by weight unless otherwise specified and the expressions "polymer" "copolymer" and "interpolymer" are used interchangeably.

EXAMPLE 1

This example illustrates the superior pressure-sensitive adhesive compositions of the present invention. Forty-five parts of methyl acrylate, 50 parts of 2-ethyl hexyl acrylate and 5 parts of 2-hydroxy ethyl methacrylate are interpolymerized in a 3 to 1 ethyl acetate/anhydrous ethanol solvent pair. One-third of the monomeric charge is added initially to the reaction vessel and the remaining two-thirds of the monomeric charge is delayed into the vessel over a 5-hour period. A separate solution of 0.5 parts of titanium butoxide in 5 parts anhydrous ethanol is added to the polymer solution using vigorous agitation.

The resulting polymer solution has a solids content of 30 percent and a Brookfield solution viscosity of 7,500 centipoises at 25 C.

A 50 milligram sample of the dried polymer is subjected to thermogravimetric analysis (TGA) in air at 300° C. The TGA curve for this material is reproduced in FIG. 1.

EXAMPLE 2

In this example a commercial pressure-sensitive adhesive for electrical tapes is subjected to a thermogravimetric analysis according to the procedure outlined in example 1. Infrared analysis of this material indicates that it is an interpolymer of acrylic acid esters and approximately 5 percent by weight of an acrylic acid comonomer. This material is subject to thermogravimetric analysis according to the procedure outlined in example 1. The analytical curve for this TGA analysis is reproduced in FIG. 1.

A review of FIG. 1 readily illustrates the superior thermostability that is obtained in the polymeric products of the present invention. Note that the weight loss for the commercial polymer of example 2 is more than twice that for the polymer of example 1 which is prepared in accordance with the teachings of the present invention. In addition to superior thermal stability the polymer of example 1 is free from corrosion causing carboxylic acid groups.

The following examples 3 to 8 illustrate the variations of polymeric composition which are possible within the scope of this invention. In each example the monomers are polymerized according to the procedures outlined in example 1. The resulting polymer solutions are then formulated with 0.5 percent by weight of titanium butoxide based on the total polymer weight according to the procedures of example 1. The polymeric compositions which are prepared in examples 3 to 8 are outlined in the following table 1.

TABLE I

| | SUMMARY OF EXAMPLES 3 to 8 | | | |
|---|---|---|---|---|
| | | Monomers (1) | | Parts (2) |
| Examples | A | B | C | A B C |
| 3 | EHA | BA | HEMA | 35 / 60 / 5 |
| 4 | EHA | MA | HEMA | 50 / 44 / 6 |
| 5 | EHA | MA | HEA | 50 / 45 / 5 |
| 6 | EHA | MMA | HPF | 50 / 45 / 5 |
| 7 | EHA | MMA | HEA | 50 / 30 / 20 |
| 8 | EHMA | BA | HEA | 60 / 30 / 10 |

(1) Monomers indicates monomers selected from each of the respective groups A, B and C which are designated above.

(2) Parts by weight of the monomers indicated.

Abbreviations
BA—butyl acrylate
MA—methyl acrylate
MMA—methyl methacrylate
EHA—2-ethyl hexyl acrylate
EHMA—2-ethyl hexyl methacrylate
HEA—hydroxyethyl acrylate
HEMA—hydroxyethyl methacrylate
HPF—hydroxypropyl fumarate The following examples 9 to 12 are set forth to illustrate the relatively poor thermal stability that is obtained with the pressure-sensitive copolymers of the prior art.

EXAMPLE 9

Fifty parts of vinyl acetate and 50 parts of 2-ethyl hexyl acrylate are polymerized in a 1/2/1 hexane/toluene/ethyl acetate solvent system. The resulting polymeric solution has a solids content of 40 percent and a Brookfield viscosity of about 800 centipoises.

EXAMPLE 10

An interpolymer is prepared from 45 parts of vinyl acetate, 50 parts of 2-ethyl hexyl acrylate and 5 parts of hydroxy ethyl methacrylate in the solvent system of example 1. The resulting polymer has a solids content of 31 percent and a Brookfield viscosity of 600 centipoises.

EXAMPLE 11

The polymeric solution prepared in example 9 above is formulated with 0.4 percent titanium butoxide according to the procedure outlined in example 1.

EXAMPLE 12

This example uses a combination of a carboxylic acid monomer and glycidyl methacrylate in the preparation of a pressure-sensitive adhesive. Sixty parts of 2-ethyl hexyl acrylate, 34 parts of methyl acrylate, 5 parts acrylic acid and 1 part of glycidyl acrylate are polymerized in a 4/1 ethyl acetate/hexane solvent system. The resulting polymer solution has a solids content of about 40 percent and a Brookfield solution viscosity of 10,000 centipoises.

The polymers prepared in examples 9 to 12 along with the polymers prepared in examples 1, 2 and 3 above are subjected to thermogravimetric analysis (TGA) in a nitrogen atmosphere using a DuPont 950 Thermogravimetric Analyzer. The polymers are scanned over the range of from 25° C. to 450° C. at a heating rate of 5° C. per minute. The percent weight loss for the polymers at 350° C. during the TGA scan is reported in table II below.

TABLE II

| PERCENT WEIGHT LOSS AT 350° C. UNDER NITROGEN ATMOSPHERE | |
|---|---|
| EXAMPLE | % WEIGHT LOSS |
| 1 | 5 |
| 2 | 8 |
| 3 | 2 |
| 9 | 14 |
| 10 | 10 |
| 11 | 10 |
| 12 | 10 |

The thermogravimetric analysis data shown in table 11 is an index to the suitability of these materials for use as the pressure-sensitive adhesive component in Class F systems. The preferred Class F adhesives are those which exhibit a weight loss at 350° C. under a nitrogen atmosphere of less than 10 percent and more preferably less than 7.5 percent.

The data in table 11 illustrate the superior thermal properties which are exhibited by the polymeric compositions of the present invention. The polymers of examples 1 and 3, which represent two of the preferred compositions of the present invention, exhibit only 5 and 2 percent weight loss respectively, at 350° c. The superior thermal stability of these materials make them especially suitable as the adhesive component for Class F electrical tapes. This suitability for Class F applications is unexpected because interpolymers of acrylic acid esters are notoriously soft and thermoplastic and degrade upon prolonged exposure to elevated temperatures.

The polymer of example 2, which is a commercially available pressure-sensitive electrical tape composition, exhibits four times as much weight loss as does the polymer of example 3. Furthermore, the polymer of example 2 contains about 5 percent carboxylic acid groups which provide loci for copper corrosion which could lead to voltage breakdown or current leakage and eventually breakdown in the electrical system in which this interpolymer is used.

Examples 9 and 10 illustrate the poor thermal stabilities of pressure-sensitive adhesives which contain vinyl acetate as a comonomer. In example 11 titanium butoxide is added to the polymeric composition of example 10. However, no increase in thermal stability is obtained. As stated above this thermal instability is due in part to the presence of vinyl acetate in the polymeric composition.

Example 12 illustrates an all acrylate system wherein a combination of acrylic acid and glycidyl acrylate is used to provide cross-linking of the polymeric composition. However, this system does not exhibit the thermal stability of the preferred polymeric compositions of examples 1 and 3.

The following examples 13 to 16 are set forth to illustrate the superior pressure-sensitive characteristics of the polymeric compositions of the present invention as measured by a conventional creep test. In these examples the polymeric solutions are coated on a polyethylene terephthalate tape and cured for 2 minutes at 95° C., so as to give a dried polymeric film 1-mil-thick. One-half -inch strips of the coated tape are cut and applied to mild steel panels so as to give a 0.25-sq.in.-bond. One hour after the strips are adhered to the panel (1)-pound loads are attached to the free end of the tape and the time to bond failure is measured.

EXAMPLE 13

In this example the copolymer used is prepared as in example 1 except that the polymer solution is not formulated with titanium butoxide. The adhesive bond failed in the creep test in less than 10 minutes.

EXAMPLE 14

In this example the titanium butoxide formulated adhesive composition of example 1 is used. The adhesive bond is still intact at the end of 3 months.

EXAMPLE 15

In this example the polymeric composition of example 3 is used except that the material is not formulated with titanium butoxide. Strips of this material failed in the bond creep test in less than 1 minute.

EXAMPLE 16

Example 15 is repeated here except that the polymeric composition of example 3 which has been formulated with titanium butoxide is used. The adhesive bond is still intact at the end of 3 months.

EXAMPLE 17

One hundred grams of the unformulated polymer solution (35 percent solids) used in example 13 and 5, 5 g. of Mondur S-blocked isocyanate supplied by Mobay Chemical Company are blended together. The blend is coated on a film of polyethylene terephthalate and dried for 2 minutes at 95° C. The bond fails in 10 minutes in the creep test. After baking at 300° F. for 30 minutes, the adhesive bond is still intact at the end of 3 months. The solvent resistance of this material is excellent.

EXAMPLE 18

In this example a solution of 2,2-bis(t-butyl peroxy)butane is dissolved in anhydrous ethanol. This solution is then added to the titanium butoxide containing composition of example 1 so as to give a 2,2-bis(t-butyl peroxy)butane content of 0.5 percent by weight based on the weight of the polymeric composition. The polymer is then coated on a film of polyethylene terephthalate so as to give a 1-mil dry film of the polymer. The film is dried at 25° C. for 24 hours and then tested in the creep test described for examples 13 to 17 above. The adhesive bond is still intact at the end of 3 months.

The polymeric solutions of examples 14, 16 and 18 are coated onto a glass cloth so as to give a 5-mil film of the dried polymer. The films are then baked for 30 minutes at 180° F. in order to simulate the conditions which are normally used to remove the moisture from electrical assemblies. The coated strips are then immersed into xylene, Solvesso, alcohol, n-methyl pyrrolidone and cresylic acid solvents for 24 hours. After this time the strips are examined and those prepared using the polymeric compositions of examples 14 and 16 exhibit only very slight swelling while the composition of example 18 exhibits virtually no swelling.

This excellent resistance to solvent attack was not observed in the polymers of examples 13 and 15 which did not contain a curing agent. These samples swelled excessively and were partially dissolved in the solvents.

EXAMPLE 19

A transformer wrapping tape is prepared by coating a glass cloth with the polymeric composition of example 1 so as to obtain a dried polymeric film 1-mil-thick. The coated glass cloth is then dried in a circulating air oven for 2 minutes at 95° C. The tape is tested for thermal stability, holding power and solvent resistance and found to be excellent in all respects.

EXAMPLE 20

Example 19 is repeated here except that the backing member is a polyimide film which is prepared from pyromellitic dianhydride and methylene dianiline. Comparable results are obtained.

EXAMPLE 21

Example 19 is repeated here except using the adhesive composition of example 3. Comparable results are obtained.

EXAMPLE 22

Example 21 is repeated here except that the backing member is a polyimide film which is prepared from pyromellitic dianhydride and methylene dianiline. Comparable results are obtained.

EXAMPLE 23

Example 19 is repeated here except that titanium isopropoxide is used as the curing agent. Comparable results are obtained.

While the present invention has been described with particular reference to certain specific embodiments thereof, it will be understood that certain changes, substitutions and modifications may be made therein without departing from the scope thereof. This invention also contemplates the use of thermally stable noncorrosive fillers, extenders, stabilizers, tackifiers, dyes, etc., in the polymeric compositions of this invention.

What is claimed is:

1. A Class F electrical tape which is free from components which would cause corrosion of the conductive parts of the electrical system to which it is applied, which tape comprises a backing member coated with a pressure-sensitive adhesive composition which is the interpolymerization product of from 20 to 85 weight percent of A; 15 to 55 weight percent of B; and 1 to 20 weight percent of C wherein the total weight percent of A, B and C equals 100 weight percent; wherein (A) is a monomer selected from the group consisting of esters of acrylic acid containing of from seven to 20 carbon atoms and esters of methacrylic acid containing of from eight to 20 carbon atoms; (B) is a monomer selected from the group consisting of ethyl, methyl, and propyl esters of acrylic acid and ethyl, methyl, propyl and butyl esters of methacrylic acid; and (C) is a hydroxy bearing monomer selected from the group consisting of hydroxy alkyl acrylates, hydroxy alkyl methacrylates, 2-hydroxy alkyl vinyl ether, hydroxy alkyl fumarates and hydroxy alkyl maleates wherein the alkyl group contains from two to four carbon atoms; wherein the adhesive composition contains a curing system which comprises: (a) from 0.1 to 5.0 equivalents of metal alkoxide per equivalent of active hydrogen in the interpolymerization product of A, B and C; and (b) from 0.1 to 3.0 percent by weight, based on the weight of the interpolymerization product of A, B and C, of an organic peroxide which does not yield acid products upon decomposition.

2. A Class F electrical tape as in claim 1 wherein the pressure-sensitive adhesive composition is the interpolymerization product of (A) 2-ethylhexyl acrylate, (B) a monomer selected from the group consisting of methyl acrylate, ethyl acrylate and butyl acrylate and (C) a hydroxy-bearing monomer selected from the group consisting of hydroxy alkyl acrylates, hydroxy alkyl methacrylates, 2-hydroxy alkyl vinyl ether, hydroxy alkyl fumarates and hydroxy alkyl maleates wherein the alkyl group contains from two to four carbon atoms.

3. A Class F electrical tape as in claim 2 wherein the metal alkoxide is selected from the group consisting of titanium isopropoxide and titanium butoxide.

4. A Class F electrical tape as in claim 3 wherein the backing member is selected from the group consisting of polytetrafluoroethylene, polyethylene terephthalate, polyimide and glass.

5. A Class F electrical tape as in claim 3 wherein the organic peroxide is selected from the group consisting of t-butyl peroxide and cumyl peroxide.

6. A Class F electrical tape which is free from components which would cause corrosion of the conductive parts of the electrical system to which it is applied, which tape comprises a backing member coated with a pressure-sensitive adhesive composition which is the interpolymerization product of from 20 to 85 weight percent of A; 15 to 55 weight percent of B; and 1 to 20 weight percent of C wherein the total weight percent of A, B and C equals 100 weight percent; wherein (A) is a monomer selected from the group consisting of esters of acrylic acid containing of from seven to 20 carbon atoms and esters of methacrylic acid containing of from eight to 20 carbon atoms; (B) is a monomer selected from the group consisting of ethyl, methyl, and propyl esters of acrylic acid and ethyl, methyl, propyl and butyl esters of methacrylic acid; and (C) is a hydroxy-bearing monomer selected from the group consisting of hydroxy alkyl acrylates, hydroxy alkyl methacrylates, 2-hydroxy alkyl vinyl ether, hydroxy alkyl fumarates and hydroxy alkyl maleates wherein the alkyl group contains from two to four carbon atoms; wherein the adhesive composition contains a curing system which comprises: (a) from 0.1 to 5.0 equivalents of metal alkoxide per equivalent of active hydrogen in the interpolymerization product of A, B and C; and (b) from 0.1 to 3.0 percent by weight, based on the weight of the interpolymerization product of A, B and C, of an organic peroxide which does not yield acid products upon decomposition selected from the group consisting of t-butyl-hydroperoxide; t-butyl peroxide; 1,1-bis(t-butyl-peroxy)3,3,5-trimethylcyclohexane; 2,2-bis(t-butylperoxy)butane; 2-methoxy-2-t-butylperoxypropane; 2,4,6-tri(t-butylperoxy)triazine; t-amyl peroxide; and cumyl peroxide.

7. A Class F electrical tape as in claim 6 wherein the pressure-sensitive adhesive composition is the interpolymerization product of (A) 2-ethylhexyl acrylate, (B) a monomer selected from the group consisting of methyl acrylate, ethyl acrylate and butyl acrylate and (C) a hydroxy-bearing monomer selected from the group consisting of hydroxy alkyl acrylates, hydroxy alkyl methacrylates, 2-hydroxy alkyl vinyl ether, hydroxy alkyl fumarates and hydroxy alkyl maleates wherein the alkyl group contains from two to four carbon atoms.

8. A Class F electrical tape as in claim 6 wherein the metal alkoxide is selected from the group consisting of titanium isopropoxide and titanium butoxide.

9. A Class F electrical tape as in claim 6 wherein the backing member is selected from the group consisting of polytetrafluoroethylene, polyethylene terephthalate, polyimide and glass.

10. A Class F electrical tape which is free from components which would cause corrosion of the conductive parts of the electrical system to which it is applied, which tape comprises a backing member coated with a pressure-sensitive adhesive composition which is the interpolymerization product of (A) from 20 to 85 weight percent of 2-ethylhexyl acrylate, (B) 15 to 55 weight percent of a monomer selected from the group consisting of methyl acrylate, ethyl acrylate and butyl acrylate and (C) 1 to 20 weight percent of a hydroxy-bearing monomer selected from the group consisting of hydroxy alkyl acrylates, hydroxy alkyl methacrylates, 2-hydroxy alkyl vinyl ether, hydroxy alkyl fumarates and hydroxy alkyl maleates wherein the alkyl group contains from two to four carbon atoms; wherein the total weight percent of A, B and C equals 100 weight percent; wherein the adhesive composition contains a curing system which comprises: (a) from 0.1 to 5.0 equivalents per equivalents of active hydrogen in the adhesive composition of a metal alkoxide selected from the group consisting of titanium isopropoxide and titanium butoxide; and (b) from 0.1 percent to 3.0 percent by weight of an organic peroxide selected from the group consisting of t-butyl peroxide and cumyl peroxide.

* * * * *